US008659505B2

(12) United States Patent
Polivy et al.

(10) Patent No.: US 8,659,505 B2
(45) Date of Patent: Feb. 25, 2014

(54) AUXILIARY DISPLAY DEVICE DRIVER INTERFACE

(75) Inventors: Daniel J. Polivy, Seattle, WA (US); Andrew J. Fuller, Redmond, WA (US); Sriram Viji, Seattle, WA (US); Matthew P Rhoten, Kirkland, WA (US); Teague C. Mapes, Woodinville, WA (US)

(73) Assignee: Mircosoft Corporation, Redmond, WA (US)

( * ) Notice: Subject to any disclaimer, the term of this patent is extended or adjusted under 35 U.S.C. 154(b) by 1579 days.

(21) Appl. No.: 11/410,856

(22) Filed: Apr. 24, 2006

(65) Prior Publication Data

US 2007/0046562 A1   Mar. 1, 2007

Related U.S. Application Data

(60) Provisional application No. 60/713,238, filed on Aug. 31, 2005.

(51) Int. Cl.
*G09G 5/00* (2006.01)

(52) U.S. Cl.
USPC ............. 345/2.3; 345/204; 709/223; 709/201

(58) Field of Classification Search
USPC ............. 345/1.1, 545, 2.3; 725/113; 709/223, 709/201, 230
See application file for complete search history.

(56) References Cited

U.S. PATENT DOCUMENTS

| 5,515,081 | A  * | 5/1996  | Vasilik ........................ 345/545 |
| 6,882,326 | B2 * | 4/2005  | Hirayama et al. ............ 345/1.1 |
| 6,919,864 | B1   | 7/2005  | Macor |
| 7,152,211 | B1 * | 12/2006 | Fernandez et al. ............ 715/767 |
| 2003/0154492 | A1 * | 8/2003 | Falvo et al. .................... 725/113 |
| 2004/0051732 | A1 * | 3/2004 | White et al. ................... 345/736 |
| 2004/0177361 | A1 * | 9/2004 | Bernhard et al. ............. 719/321 |
| 2004/0225901 | A1   | 11/2004 | Bear et al. |
| 2005/0066209 | A1   | 3/2005 | Kee et al. |

FOREIGN PATENT DOCUMENTS

JP      1998-319139      12/1998
WO      WO 03038582      5/2003

OTHER PUBLICATIONS

PCT International Search Report and Written Opinion in Application PCT/US2006/033820, mailed Jan. 8, 2007, 6 pgs.
Chinese 1$^{st}$ Office Action in Application 200680031308.6, mailed Jan. 22, 2010, 11 pgs.

(Continued)

*Primary Examiner* — Amare Mengistu
*Assistant Examiner* — Joseph G Rodriguez
(74) *Attorney, Agent, or Firm* — Andrew Sanders; Micky Minhas

(57) ABSTRACT

In a main computer system coupled to an auxiliary display device, described is an interface set for implementation by an auxiliary display device driver, to couple the driver to an auxiliary display platform. Commands received from the auxiliary display platform may be handled by code external to the driver, such as a class extension object. For example, the class extension object may interpret and/or translate commands received from the auxiliary display platform into a format understood by the driver code. The auxiliary display device driver may then provide corresponding command information including data to the auxiliary display device via the transport. Event data may be returned from the auxiliary display device driver via the interface set to the class extension object, such that corresponding event information, e.g., received at the auxiliary display device, may be returned to the auxiliary display platform.

20 Claims, 4 Drawing Sheets

(56) References Cited

OTHER PUBLICATIONS

Fuller, Andrew, "Auxiliary Display Platform in Longhorn", Internet Article retrieved from http://download.microsoft.com/download/9/8/f/98f3fe47-dfc3-4e74-92a3-08878220fe7/TWDT05004_WinHEC05.ppt, Apr. 27, 2005, 5 pgs.
Chinese 2$^{nd}$ Office Action in Application 200680031308.6, mailed Jan. 14, 2011, 7 pgs.
Chinese 3rd Office Action in Application 200680031308.6, mailed Dec. 26, 2011, 6 pgs.
Chinese 4th Office Action in Application 200680031308.6, mailed Jun. 4, 2012, 6 pgs.
Chinese Notice of Allowance in Application 200680031308.6, mailed Sep. 5, 2012, 4 pgs.
European Supplemental Search Report in Application EP 06790093, mailed Dec. 29, 2008, 3 pgs.
Egger M, "Unveiling Windows Sideshow", Code Magazine, [Online], vol. 3, No. 1, Dec. 30, 2005, Retrieved from the Internet: http://codemagazine.com/articleprint.aspx?quickid=0512122&printmode=true, 8 pgs.
Anonymous, Code Magazine, "Online Content", Internet Article, [Online], Nov. 26, 2008, Retrieved from the Internet: http://www.code-magazin.de/ContentByCategory.aspx?cat=37bf2c69-68a5-4afb-9836-b76453a9cc04, 6 pgs.
Butler, J., "Device-Independent Graphics Output for Microsoft Windows", BYTE [Online], 1983, Retrieved from the Internet: http://www.guidebookgallery.org/articles/microsoftwindows/deviceindependentgraphicsoutput, 2 pgs.
Korean Notice of Preliminary Rejection in Application 10-2008-7004927, mailed Mar. 9, 2013, 12 pgs.
Australian Examination Report in Singapore Application 200801256-9, mailed Mar. 16, 2009, 4 pgs.

* cited by examiner

AUXILIARY DISPLAY DEVICE DRIVER INTERFACE

CROSS-REFERENCE TO RELATED APPLICATION

The present application claims priority to U.S. provisional patent application Ser. No. 60/713,238, filed Aug. 31, 2005, and hereby incorporated by reference.

BACKGROUND

In contemporary (e.g., Windows® Vista™-based) computer systems, users are able to view and generally interact with selected content on a small auxiliary display device coupled to or integrated into a main host computer system. To this end, an auxiliary display screen along with an operating system-provided platform (referred to as an auxiliary display platform, or a Windows® SideShow™ platform), enables developers and authors to present content to users. This allows the user to view the content even when the main host computer system is in a reduced power state (e.g., ACPI S3 sleep state), or even turned off.

When creating an auxiliary display device for an operating system such as Microsoft® Windows®, device manufacturers, also referred to as independent hardware vendors, or IHVs, implement a Windows® Vista™ User Mode Driver Framework (UMDF) driver that facilitates communications between the auxiliary display platform and the auxiliary display device. Creating a driver is complicated, as among other things, an auxiliary display driver is required to decode data from the auxiliary display platform into logical auxiliary display operations, and then transmit those intentions to the device through a protocol that the auxiliary display device understands. Auxiliary display devices potentially can take many forms, and the underlying transport protocol used to communicate with the device can vary from device type to device type. Creating a driver is thus a particularly time consuming, burdensome, tedious and error-prone endeavor for device manufacturers.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards an interface set that may be implemented by an auxiliary display device driver to couple the driver to an auxiliary display platform. By calling into the auxiliary display device driver via the interface set, commands received from the auxiliary display platform may be handled by code external to the driver, thereby facilitating communication between the auxiliary display platform and the driver. For example, a class extension object may interpret and/or translate commands received from the auxiliary display platform into a format the driver code can more easily handle, thereby simplifying the driver code. Event data may be provided from the auxiliary display device driver such that corresponding event information may be passed to the auxiliary display platform.

Thus, the auxiliary display platform may provide data directed towards the auxiliary display device from one or more application programs, and when an auxiliary display device driver receives the data, an interface set implemented by the auxiliary display device driver allows a helper object to process commands received as data from the auxiliary display platform and to call back to the auxiliary display device driver via the interface with corresponding data. For example, upon receiving a call from the auxiliary display device driver that includes a command related to performing an operation related to an auxiliary display, the helper object may translate the call and command into data in a data format understood by the auxiliary display device driver, and call back the auxiliary display device driver with the data. The auxiliary display device driver may then provide corresponding information to the auxiliary display device via the transport.

Other advantages will become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
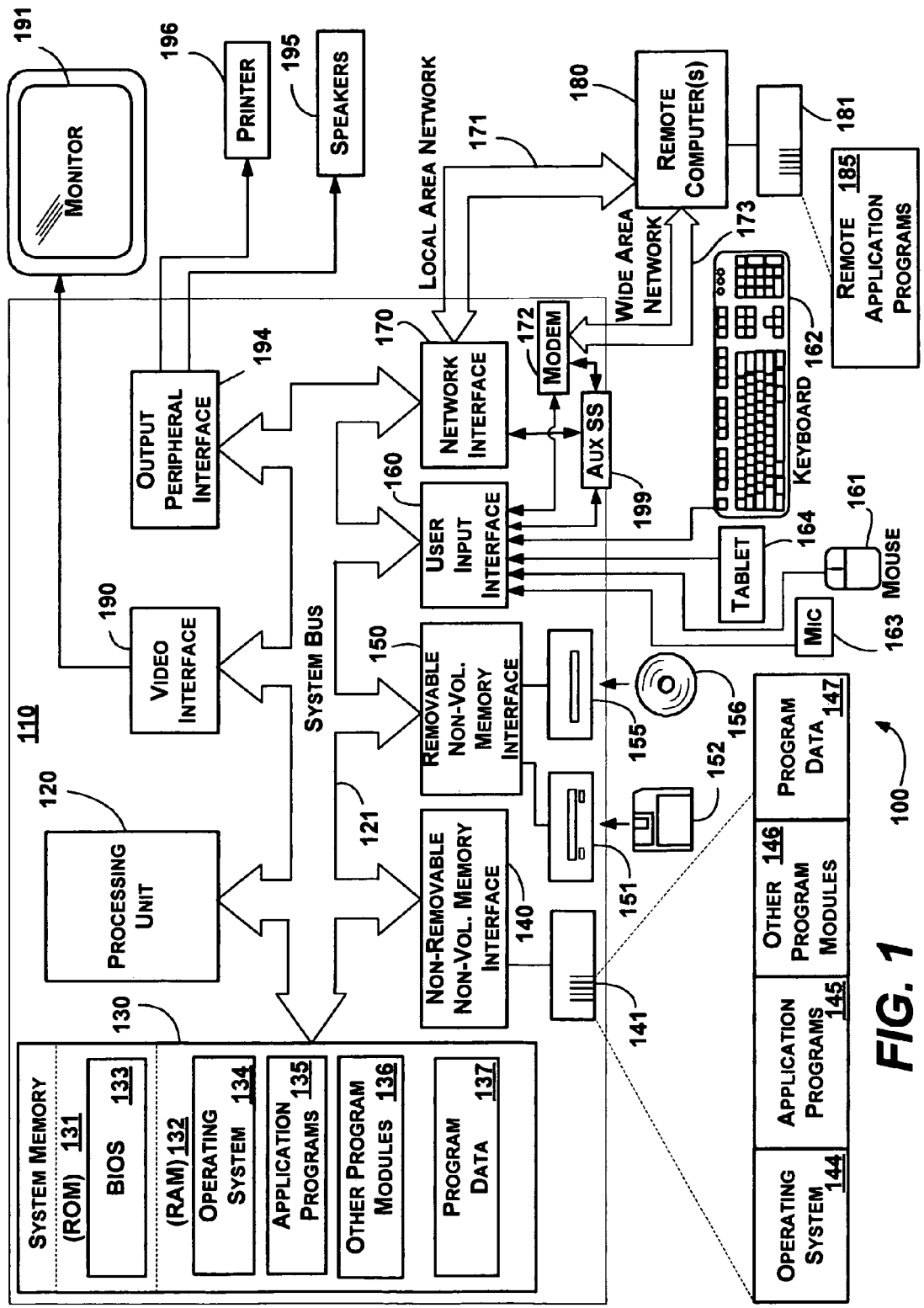
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

An auxiliary display subsystem 199 may be connected via the user interface 160 to allow data such as program content, system status and event notifications to be provided to the user, even if the main portions of the computer system are in a low power state. The auxiliary display subsystem 199 may be connected to the modem 172 and/or network interface 170 to allow communication between these systems while the main processing unit 120 is in a low power state.

Auxiliary Display Device Driver Interface

Various aspects of the technology described herein are directed towards simplifying the task of writing an auxiliary display driver. In part this is accomplished providing a common mechanism that implements a set of well-defined logical auxiliary display operations, thereby reducing the amount of work that a driver implementer needs to perform. As a result, driver implementers can, for the most part, direct their efforts to providing a transport mechanism to their auxiliary display device, and need not concern themselves with the complexity of the communication between the auxiliary display driver and the auxiliary display platform.

To this end, there are provided the concepts of an interface for an auxiliary display driver, along with a set of logical auxiliary display operations that make up the device driver interface. As will be understood, however, the technology described herein is not limited to these concepts or the examples used to describe the device driver interface, or the auxiliary display driver interface, such as the examples described herein that are based on COM (component object model) technology. Moreover, the technology described herein is not limited to any particular types of auxiliary devices, but rather includes devices not conventionally thought of as devices that are "computer-system" coupled devices, such as television sets, audio receivers, audio/video recorders, telephones, a separate computer, a mobile communications device, a secondary display screen with actuators, a watch, a wall (e.g., kitchen) display, a display screen, a digital picture frame, a clock, a radio, a media player, a device embedded within or using the main display of a consumer electronics device, automotive, transportation or other vehicular units, keyboards or other input devices of the main computer system, a pager, a personal digital assistant, and so forth. As such, the present invention is not limited to the examples, structures or functionality described herein; rather, any of the examples, structures or functionalities described herein are non-limiting, and the present invention may be used various ways that provide benefits and advantages in computing, data communication and content handling in general.

Figure 2:
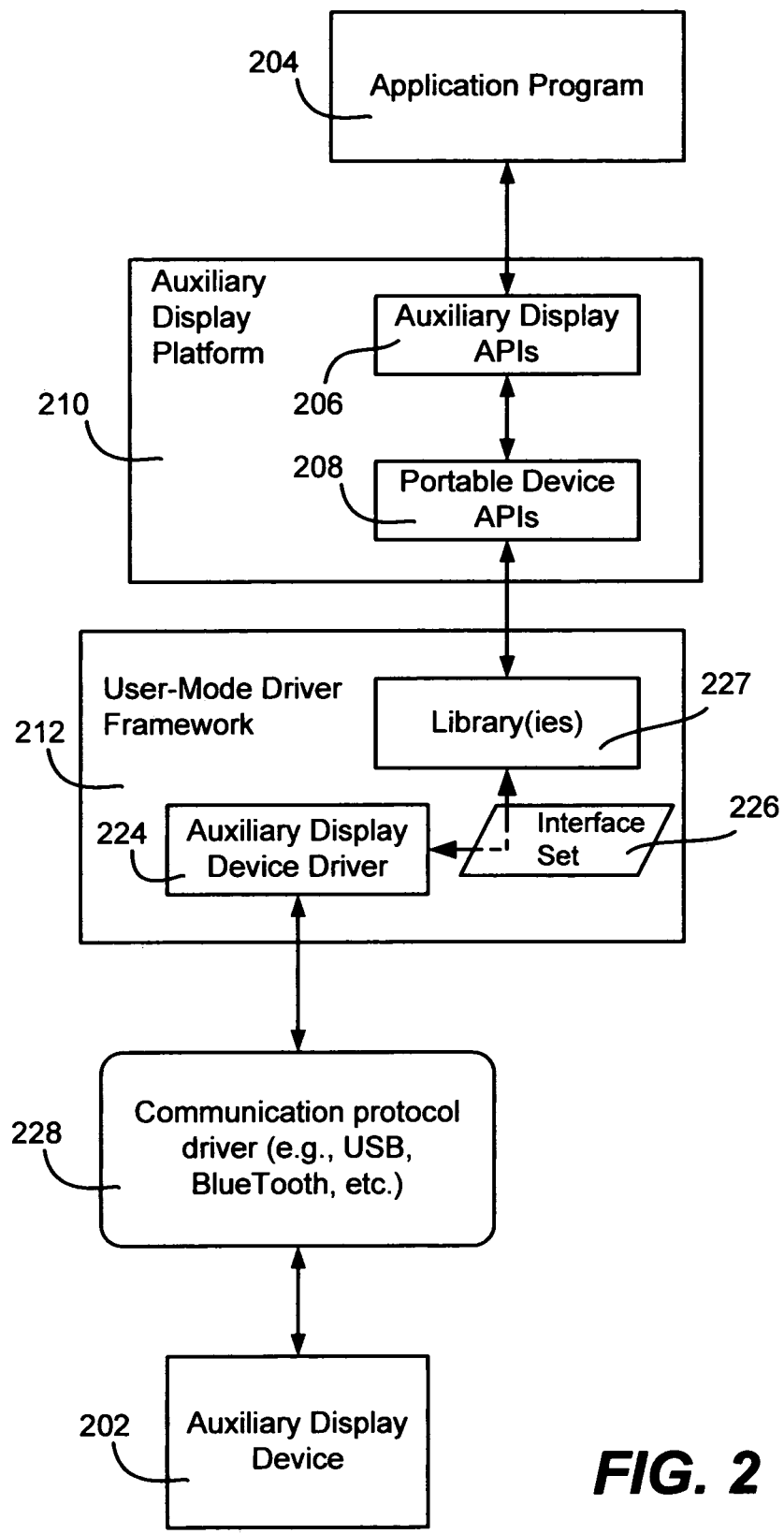
FIG. 2 is a block diagram representing an example architecture in which an interface set may be implemented for auxiliary display device communication.

Turning to FIG. 2 of the drawings, there is shown an example architecture that exposes one or more auxiliary devices (e.g., one auxiliary device 202 is shown in FIG. 2) to clients comprising application programs 204 and other programs (e.g., operating system components). To communicate data to and from the program 204 at the program level, an auxiliary display API set 206 is present, which provides APIs for various functions, including registering the client application 204 (a component of the program or possibly the program itself) with the system, sending content to the coupled auxiliary device 202, sending notifications to the coupled auxiliary device 202, and receiving events from the coupled auxiliary device 202. Events may include navigation events, content request events, content change events, and so forth. Software code such as operating system components and/or application programs may also be uploaded to the auxiliary device.

In the example of FIG. 2, the API layer 206 is written on a portable device API set 208, which together can be considered as an auxiliary display platform 210. In general, the portable device API set 208 maps the auxiliary display device 202 into a category of portable devices, and allows enumeration of the device's capabilities. This is encapsulated within the user-mode driver framework 212, however, and not exposed to the client application 204. For example, the set of auxiliary display APIs 206 may use Windows Portable Device (WPD) functions to communicate through Interprocess Communications (IPC) to the driver framework 212 that in turn communicates data to the device 202. To enable the pieces of this platform to interact with each other, an interface is defined between each layer, including an interface that needs to be exposed by the driver of a device to enable auxiliary display functionality at the driver level.

Turning to the hardware vendor's perspective, in general, each auxiliary display device vendor provides a corresponding auxiliary device driver 224 (although in some situations a device can use a generic driver, and thus, for example may be provided by the auxiliary display platform provider). In general, the user mode driver framework provides a device driver interface (DDI) set 226 such as via libraries 227 or the like for coupling device drivers (e.g., 224) to the auxiliary display platform 210. The driver 224 can then implement the interface set 226 to receive data from the auxiliary display platform corresponding to the API-received information, and forward corresponding data to an appropriate hardware interface (transport) 230 for communication to the auxiliary display device. For example, in FIG. 2, examples shown are USB and Bluetooth®, although other types of transports including Wi-FI, AM/FM, infrared, network transports such as TCP/IP-based transports, and so forth are feasible. As is understood, these connections are only shown for example purposes, as any device driver will forward data for wireless or wired communication as appropriate.

Figure 3:
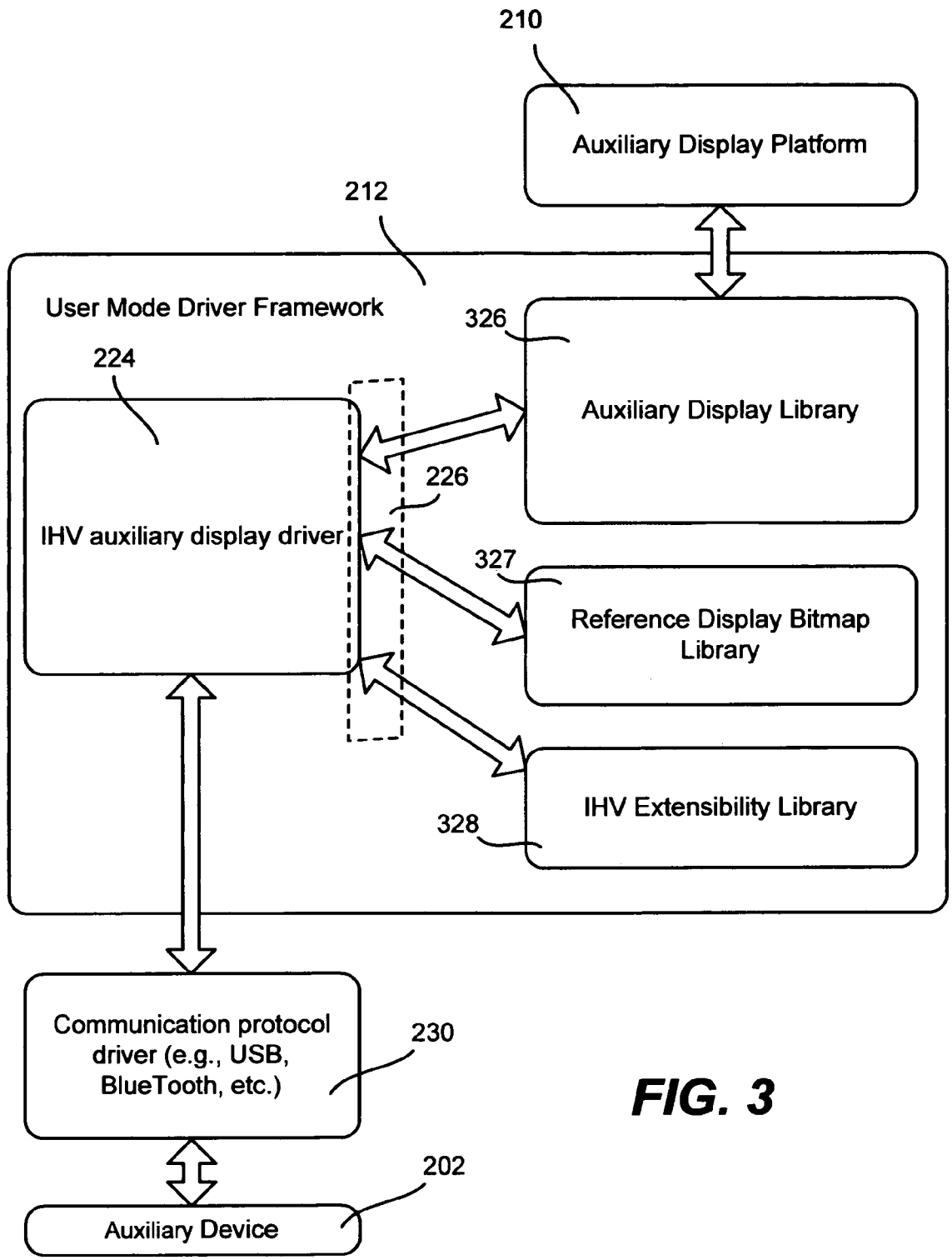
FIG. 3 is a block diagram representing example components including libraries in which an interface may be implemented for auxiliary display device communication.

FIG. 3 shows an example of the user mode driver framework 212 in more detail. As described above, the user mode driver framework 212 hosts the user mode auxiliary display driver 224, comprising a main component typically written by an independent hardware vendor, or IHV. One of the driver's roles is to extract information from the auxiliary display platform 210, and pass any navigation events input at the auxiliary device 202 back to the auxiliary display platform 210. Depending on the capabilities of the auxiliary device 202, the auxiliary display driver 224 may convert the data from the auxiliary display platform 210's format (which, for example may arrive in a Simple Content Format comprising a data format defined in XML) into something the device can more easily render, such as a bitmap.

To communicate with the auxiliary device 202, as represented in FIG. 3, the auxiliary display driver 224 can use any suitable communication protocol the driver writer (e.g., IHV) chooses, essentially stacking the transport driver 230 beneath the auxiliary display driver 224. Note that in one example implementation, connection and/or device discovery (if appropriate) are handled by the code in the auxiliary display driver 224, but in most cases, device discovery is performed by the operating system's PnP or PnP-X subsystems.

To interface to the auxiliary display platform 210, the auxiliary display driver 224 links in the auxiliary display class extension library 326. As represented in FIG. 3, once linked, the auxiliary display class extension library 326 provides a communications conduit to the auxiliary display platform 210. In one example implementation, the auxiliary display class extension library 326 exposes an interface to access data from the auxiliary display platform 210 and to pass any navigation events, received via the auxiliary display device 202, back to the auxiliary display platform 210. In one example implementation (generally represented in FIG. 4), the auxiliary display class extension library 326 may be implemented as a COM component, which does not need to be linked directly into the auxiliary display driver 224.

A reference auxiliary display bitmap library 327, also represented in FIG. 3, comprises an optional library that the driver 224 may use, simplifying software development for driver writers willing to use a recommended bitmap display reference platform. For example, with the bitmap library 327, the driver 224 may have glance mode information and notifications converted from the auxiliary display platform format 210 into bitmaps that are formatted for a bitmap display reference screen resolution.

Also represented in FIG. 3 is an independent hardware vendor extensibility library 328. For example, if an independent hardware vendor has provided additional hardware connected to the auxiliary device 202 beyond the auxiliary display reference design, the driver 224 may be extended with this additional library 328 to support the extended functionality and expose that functionality to the main computer system's operating system. Examples of such additional hardware include a biometric reader, a GPS unit, and so forth. The hardware vendor extensibility library 328 may also be implemented as an additional user-mode or kernel-mode driver that acts as a filter driver, and can be either above or below the auxiliary display driver in the driver stack.

Figure 4:
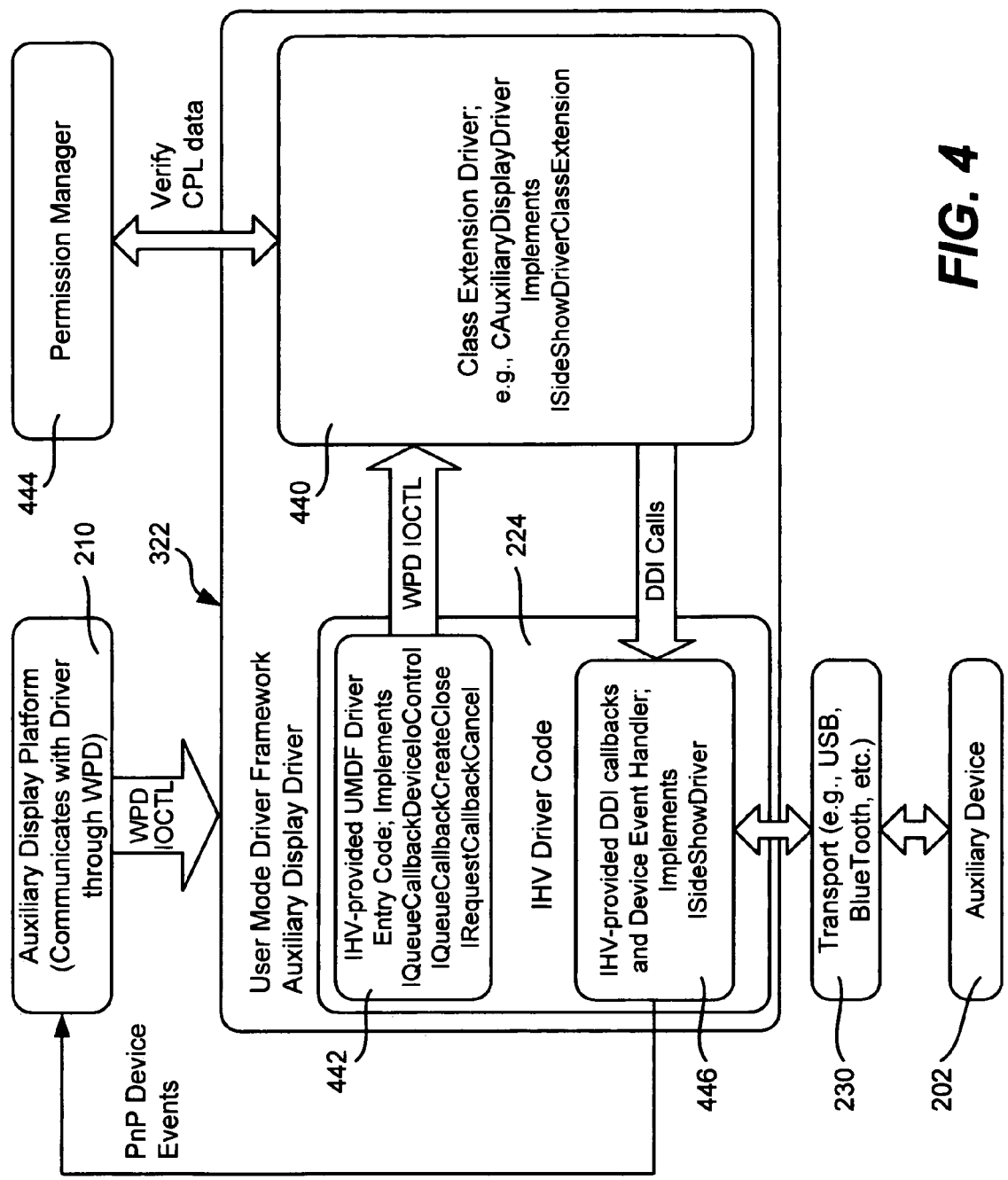
FIG. 4 is a block diagram representing example components including example interfaces and a helper object that may be used for auxiliary display device communication.

FIG. 4 provides details regarding an example, COM-based implementation that is consistent with those of FIGS. 2 and 3. In this example, a driver writer has the driver 224 implement a COM interface that comprises a collection of logical auxiliary display operations; note that depending on the actual device, not all of the interface need be implemented. In general, the implementation of the device driver interface methods provide specifics for communicating the logical intent of the device driver interface method to the auxiliary device 202, on a transport 230 of the device manufacturer's choosing that is suitable for a given device.

In one example embodiment, an instance of the implemented device driver interface object is registered with an auxiliary display class extension component, such as provided in a library that ships in Windows® Vista™. In general, the driver writer implements a light layer of driver entry code that instantiates an instance of the class extension object, and thereafter forwards incoming data to the class extension object. Also in general, the class extension object does the work of interpreting the raw incoming data into logical driver operations. The class extension object calls into the device driver interface that has been implemented, where the intent of the logical operation may be executed by the driver writer's code.

FIG. 4 illustrates the components of one example auxiliary display driver architecture. The class extension object 440 implements the ISideShowClassExtension interface and serves as a helper library for auxiliary display drivers. The class extension object 440 serves (at least) two purposes, including processing forwarded function control codes (e.g., WPD Input/Output controls, or IOCTLs) from independent hardware vendor UMDF driver entry code 442.

One purpose of the class extension object 440 is to facilitate communications between the auxiliary display platform 210 APIs and auxiliary display devices. Because the hardware and firmware that compose an auxiliary display varies among independent hardware vendors, an auxiliary display driver is extensible to allow the independent hardware vendor to support communication with their specific auxiliary display implementation over the independent hardware vendor chosen transport 230.

In the example of FIG. 4, the auxiliary display driver 224 is hosted as a standard user mode driver framework (UMDF) driver that delegates I/O control to an auxiliary display class extension library. The library comprises a COM object (e.g., provided by the platform vendor) that cracks (opens and interprets) IOCTLs, performs security checks (e.g., via a permission manager 444 that verifies control panel, or CPL, data), and translates IOCTLs into callbacks into the independent hardware vendor driver code. The independent hardware vendor callback code (e.g., in a block 446) then has the responsibility of making the actual device transactions transfer over whatever transport mechanism they use to communicate with the device. Thus, an auxiliary display driver may be implemented as two DLLs, including the independent hardware vendor provided DLL that includes the UMDF driver entry point 442 and the device specific callbacks 446, along with DLL containing the auxiliary display class extension COM object that is loaded by the independent hardware vendor DLL.

As described above, the auxiliary display class extension object 440 processes forwarded WPD IOCTLs by opening them, performing security checks on the data, and then breaking the IOCTLs out into functional calls on independent hardware vendor supplied callbacks. More particularly, the independent hardware vendor callbacks are supplied to the class extension object 440 by calling the Initialize( ) method and passing in an object that implements the ISideShowDriver interface. The class extension object takes ownership of the device driver interface object and uses it as a strategy pattern to execute driver commands.

Note that in this example implementation, the class extension object 440 does not actually post events; events are posted within the independent hardware vendor code 446. This implementation is consistent with other UMDF drivers, avoids wrapping basic UMDF functionality, and avoids closely coupling the helper library with UMDF.

As part of the platform, a driver may enable communication to enhanced displays that run auxiliary display firmware based on the TinyCLR, as generally described in U.S. patent application Ser. No. 10/996,577 filed Nov. 23, 2004, assigned to the assignee of the present application and hereby incorporated by reference. A modified version of this driver without the TinyCLR communication portion may be offered as a library that other drivers can build on top of to interface to different types of devices. Note that the library interface of the class extension 440 comprises a subset of the commands exposed in an enhanced driver that works with TinyCLR firmware.

An alternative approach to allow device and driver extensibility is to provide auxiliary display functionality as part of a Media Transfer Protocol (MTP) specification. This comprises a core section that supports basic displays as well as an extension that allows for enhanced display functionality. The auxiliary display APIs deal with sending messages using MTP to devices that support the auxiliary display commands over MTP. This will use the system provided MTP driver to communicate to the device. The device will be responsible for translating the MTP messages to a format that it can understand. Alternately, the auxiliary display class extension can be built into a filter driver which runs on top of the system-provided MTP driver and encapsulates the auxiliary display functionality in MTP commands directly, without the auxiliary display API having to know the specifics of the device it is communicating with.

Example Security and User Modes

The auxiliary display class extension object provides security by filtering device driver interface commands based on a device user mode, and by ensuring that only the authorized users(s) may set user information on the device. For device driver interface (DDI) filtering, the class extension object supports three types of device user modes:

Open Access—a device in open access mode allows users to interact with the device. The driver allows device driver interface commands for any user at any time.

Interactive User—a device in interactive user mode will only interact with the currently active console user of the main computer system. The driver rejects device driver interface commands for any user other than the current active user.

Fixed User—a device in fixed user mode only interacts with a single designated fixed user. The driver rejects device driver interface commands from the current active user (or any other user) if they are not the designated fixed user of the device. Either the device or the PC may designate the fixed user of the device, and the fixed user may change at any time.

The auxiliary display class extension object filters the device driver interface commands by taking the certain (example) steps when a device driver interface command is issued. The steps that are taken depend on the response that is returned when the driver queries the device for its user mode. For the open access user mode, the device driver interface command is let through.

If the user mode is instead Interactive, the driver gets the SID (security ID) of the current interactive user (defined as the user on the console of the main computer system), the driver gets the SID of the calling process and the driver compares the SIDs. If the SIDs are equal, the device driver interface command is let through, otherwise the command is blocked.

If the user mode is Fixed User, the driver queries the device for the SID of the current device user, and also gets the SID of the calling process. The driver compares the SIDS, and if the SIDs are equal, the device driver interface command is let through, otherwise the command is blocked.

With respect to per-user settings enforcement, the class extension object ensures that only user settings specified by an authorized user through the CPL (auxiliary display control panel applet) are applied to the device. To this end, a monitor (comprising a process that essentially runs all the time on the main computer system) has permission to read user information from the registry. This process monitors the system for events, including PnP device add, logon or logoff of a new user, and fast user switching events. When any one of these events occurs, the monitor process notifies the driver that a user information update is to occur. At this time, the class extension object impersonates the monitor process, reads the user information, and applies that information on the device. In one implementation, user information may be written and read from the registry through the permission manager 444.

When the user makes changes to settings in the CPL, the CPL calls into the driver and passes in the user data. Before making calls into the implemented callbacks, the class extension object verifies the passed-in user data against the user data contained in the registry.

Example Interfaces and Methods

ISideShowClassExtension Interface

Independent hardware vendors should CoCreateInstance( ) an instance of this class within IPnpCallbackHardware::OnPrepareHardware( ) and retain a pointer to the instance for the lifetime of the UMDF driver. This interface assists independent hardware vendors by parsing WPD IOCTLs and breaking them down into device driver interface calls on independent hardware vendor provided callbacks. Independent hardware vendors should register an ISideShowDriver object with this interface by calling Initialize( ).

HRESULT Initialize(IUnknown* WdfDeviceUnknown, IUnknown* pSideShowDriverUnknown)

This method registers an ISideShowDriver object with the class extension object and initializes the class extension for use.

HRESULT Uninitialize( )

This method unregisters the class extension object and releases any references the class extension may have.

HRESULT OnProcessIoControl(IWDFIoQueue* pQueue, IWDFIoRequest* pRequest, ULONG ControlCode, SIZE_T InputBufferSizeInBytes, SIZE_T OutputBufferSizeInBytes)

This method accepts forwarded WPD based IOCTLs. Clients should register an object that implements the ISideShowDriver interface by calling Initialize( ) before calling this method. Valid IOCTLs that may be passed into this method include the IOCTLs generated by the auxiliary display platform. Should the independent hardware vendor wish to pass custom WPD IOCTLs into this method, they are to implement handler code in the ISideShowDriver::OnProcessWpdMessage( ). Clients should complete the I/O request, as the I/O request will not be completed by this call.

ISideShowDriver Interface

The ISideShowDriver interface is used by the ISideShowClassExtension object to execute commands on the device. ISideShowDriver is an unregistered COM object that is supplied to the ISideShowClassExtension class via the Initialize method. The independent hardware vendor is responsible for implementing this interface.

HRESULT OnSetCurrentUser(SID* user, LPCWSTR pwszFriendlyName)

Used to tell the device who the current user is.

user [in] A pointer to a SID that identifies the new current user.

pwszFreindlyName [in] A string that is the friendly, human-readable user name.

HRESULT OnGetCurrentUser(SID** ppuser)

This method allows clients to ask the device for the current designated user of the device.

ppuser [out] A pointer to an address that upon return will contain the SID of the current designated user of the device. The caller should free the SID by calling FreeSid( ).

HRESULT OnSetTime(SID* User, FILETIME Time)

Used to set the current time on the device.

user [in] A pointer to a SID that indicates the owner of the calling process.

time [in] A FILETIME that is the current time.

HRESULT OnSetShortDateFormat(SID* user, LPCWSTR pwszDateFormat)

Used to set the date format of the device to short, and to indicate what that format is.

user [in] A pointer to a SID that indicates the owner of the calling process.

pwszDateFormat [in]

HRESULT OnSetLongDateFormat(SID* user, LPCWSTR pwszDateFormat)

Used to set the date format of the device to long, and to indicate what that format is.

user [in] A pointer to a SID that indicates the owner of the calling process.

pwszDateFormat [in]

HRESULT OnSetShortTimeFormat(SID* user, LPCWSTR pwszTimeFormat)

Used to set the time format of the device to short, and to indicate what that format is.

user [in] A pointer to a SID that indicates the owner of the calling process.

pwszTimeFormat [in] A string that indicates the time format.

HRESULT OnSetLongTimeFormat(SID* user, LPCWSTR pwszTimeFormat)

Used to set the time format of the device to long, and to indicate what that time format is.

user [in] A pointer to a SID that indicates the owner of the calling process.

pwszTimeFormat [in] A string that indicates the time format.

HRESULT OnSetLanguage(SID* user, LANGID lid)

This method tells the device what the current language for the given device user pair is.

user [in] A pointer to a SID that indicates the owner of the calling process.

lid [in] A LANGID that is the current language for the specified user.

HRESULT OnGetDeviceFirmwareVersion(LPCWSTR* ppwszVersion)

This method retrieves the version information for the device firmware.

ppwszversion [out] A pointer to a wide string that upon return will contain the device firmware information.

HRESULT OnGetDeviceEndpoints(ENDPOINT_ID** rgEndpoints, DWORD* cEndpoints)

This method retrieves the endpoints that are supported by the device.

user [in] A pointer to a SID that indicates the owner of the calling process.

rgEndpoints [out] A pointer to an array of ENDPOINTS that are the endpoints supported by the device. rgEndpoints should be freed by the client by calling CoTaskMemFree( ).

HRESULT OnGetDeviceCapabilities(PROPERTYKEY* pKey, PROPVARIANT* pvValue)

This method is used by the API to determine the capabilities of the device (i.e. screen resolution, color depth, etc.)

pKey [in] A pointer to a PROPERTYKEY that identifies the device capability to query.

pvValue [out] A pointer to a PROPVARIANT that upon return will contain the value for the corresponding capability.

HRESULT OnGetPreEnabledApplications(APPLICATION_ID** ppguidApps)

This method is used by the CPL to determine what the default set of applications that should be enabled on first run are. This method will be called upon device installation.

ppguidApps [out] A pointer to an array of APPLICATION_ID that upon return will contain the app ids of the default set of apps. The client is responsible for freeing the array of GUIDs with a call to CoTaskMemFree( ).

HRESULT OnAddApplication(SID* user, CONST PAPPLICATION_ID pAppId, CONST PENDPOINT_ID pEndPoint, LPCWSTR wszName, DWORD policy, CONST BYTE* pbLargeIcon, DWORD cbLargeIcon, BYTE* pbMediumIcon, DWORD cbMediumIcon, CONST BYTE* pbSmallIcon, DWORD cbSmallIcon)

This method is used by the CPL to enable an application for use by the specified user on the device.

user [in] A pointer to a SID that indicates the owner of the calling process.

pAppId [in] A pointer to a APPLICATION_ID that indicates the application to be registered with the device for the given user.

wszName [in] A LPCWSTR that is the friendly name of the application that the device may use for display purposes.

policy [in] A DWORD that indicates the cache policy to be used by the device for the app. Policy may be a value such as:

KeepOldest

KeepFrequentlyAccessed

KeepRecentlyAccessed pbLargeIcon [in] An array of bytes that is the large icon image associated with the app.

cbLargeIcon [in] The count of bytes of the large icon data pointed to by pbLargeIcon.

pbSmallIcon [in] An array of byte that is the small icon image associated with the app.

cbSmallIcon [in] The count of bytes of the small icon data pointed to by pbSmallIcon.

HRESULT OnRemoveApplication(SID* user, CONST PAPPLICATION_ID pAppId)

This method is used by the CPL to disable an application for the specified user on the device.

user [in] A pointer to a SID that indicates the owner of the calling process.

pAppId [in] A pointer to an APPLICATION_ID to be removed from the device for the specified user. HRESULT OnAddNotification(CONST PAPPLICATION_ID pAppId, NOTIFICATION_ID notificationId, FILETIME ftExpiration, LPCWSTR pwszTitle, LPCWSTR pwszMessage, CONST BYTE* pbImage, DWORD cbImage)

Sends a notification to the device.

pAppId [in] A pointer to a GUID that is the app Id for which the notification is to be sent.

notificationId [in] A NOTIFICATION_ID that is the notification id.

ftExpiration [in] A FILETIME that is the time at which the notification expires and should be removed from view on the device.

pwszTitle [in] A string that is the text of the title of the notification.

pwszMessage [in] A string that is the text of the notification message.

pbImage [in] An array of bytes that is the image associated with the notification.

cbImage [in] The count of bytes of the image, pbImage.

HRESULT OnRemoveNotification(CONST PAPPLICATION_ID pAppId, NOTIFICATION_ID notificationId)

This method removes an active notification from the device.

pAppId [in] A pointer to an APPLICATION_ID that is the app Id of the notification to be removed.

notificationId [in] A DWORD that is the notification id.

HRESULT OnRemoveAllNotifications(CONST PAPPLICATION_ID pAppId)

This method removes all notifications for an application from the device.

pApId[in] A pointer to an APPLICATION_ID that indicates the application for which all notifications should be removed.

HRESULT OnAddContent(CONST PAPPLICATION_ID pAppId, CONST PENDPOINT_ID pRendererId, CONTENT_ID contentId, CONST BYTE* pData, DWORD cbData)

This method sends content to the device for the given app.

pAppId [in] A pointer to an APPLICATION_ID that is the app Id of the app for which the content is associated.

pRendererId [in] A pointer to an ENDPOINT_ID that is the renderer Id for which the content is associated.

contented [in] The content id of the content to add. pbData [in] An array of bytes that is the content to be added to the app.

cbData [in] The count of bytes of the data.

HRESULT OnRemoveContent(CONST PAPPLICATION_ID pAppId, CONST GUID pRenderId)

This method removes content from the device for the given app.

pAppId [in] A pointer to an APPLICATION_ID of the application for which the content is to be removed.

pRendererId [in] A pointer to a GUID that is the renderer Id for which the content is associated.

HRESULT OnRemoveAllContent(CONST PAPPLICATION_ID pAppId, CONST PENDPOINT_ID pRendererId)

Removes all content for an application from the device.

pAppId [in] A pointer to an APPLICATION_ID that is the app Id of the app for which all content will be removed.

pRendererId [in] A pointer to an ENDPOINT_ID that is the renderer Id of the content to be removed.

HRESULT OnSetNotificationsEnabled([in] const SID* pUserSid, [in] const BOOL fIsEnabled)

Suppresses device-generated notifications.

user [in] A pointer to a SID that indicates the owner of the calling process.

fIsEnable [in] A Bool that indicates if notifications should be suppressed by the device.

HRESULT OnDeviceIoControl(SID* user, IWDFIoQueue* pQueue, IWDFIoRequest* pRequest, ULONG ControlCode, SIZE_T InputBufferSizeInBytes, SIZE_T OutputBufferSizeInBytes)

This method is fall-back handler that is called in response to an unknown WPD IOCTL. This method gives the independent hardware vendor the opportunity to extend the device driver interface and implement their own WPD IOCTL in the same context as the other interface methods. The independent hardware vendor is responsible for validation and security checks on the passed-in data. The intent of the method is provide a mechanism to extend rather than bypass the device driver interface.

HRESULT OnGetDeviceName([out, string] LPWSTR* ppwszName)

This method is used to retrieve the name of the device for display purposes in the Device Manager.

HRESULT OnGetDeviceManufacturer([out, string] LPWSTR* ppwszManufacturer)

This method is used to retrieve the name of the device manufacturer for display purposes in the Device Manager.

As can be readily appreciated, most of the driver code is not algorithm intensive. A possible exception is a mechanism within the driver that deduces what the logical WPD object is based on an object ID. The class extension object uses regular expressions to match object IDs to logical WPD objects. This may be optimized by replacing the regular expressions with a more simplistic string parsing function, although doing so trades off robustness for speed.

What is claimed is:

1. In a computing environment, a method comprising:
providing an interface set comprising logical auxiliary display operations with at least one interface,
the at least one interface of the interface set being implemented by an auxiliary display device driver to couple the auxiliary display device driver to a separate auxiliary display platform,
the auxiliary display device driver implementing the at least one interface of the interface set to send commands corresponding to logical auxiliary display operations to at least one auxiliary display device,
the auxiliary display device driver implementing the at least one interface of the interface set to send device event data received from the at least one auxiliary display device to the auxiliary display platform, the device event data including a content missing event packet; and
calling into the auxiliary display device driver via the at least one interface of the interface set, including making calls corresponding to commands received from the auxiliary display platform to be performed by the at least one auxiliary display device.

2. The method of claim 1 further comprising,
performing security checks via a class extension object and a monitor process, the calling into the auxiliary display device driver via the at least one interface of the interface set comprising:
communicating with the auxiliary display platform via the class extension object.

3. In a computing environment having a main computer system and an auxiliary display device, a system comprising:
an auxiliary display platform that provides data directed towards the auxiliary display device from one or more application programs;
an auxiliary display device driver that receives the data from the auxiliary display platform and provides corresponding information to the auxiliary display device via a transport;
an interface set comprising logical auxiliary display operations implemented by the auxiliary display device driver, wherein the interface set comprises code that is external to the auxiliary display device driver; and
a class extension object that communicates with the auxiliary display device driver via the interface set, the class extension object configured to process commands received as data from the auxiliary display platform and to call back to the auxiliary display device driver via the interface with corresponding data, for providing as the corresponding information to the auxiliary display device via the transport, wherein the class extension object is also configured to send device event data received by the auxiliary display device driver from the auxiliary display device to the auxiliary display platform,
wherein the interface set includes an interface that is used to create device event data for communicating events received from the auxiliary display device from the auxiliary display device driver to the auxiliary display platform, wherein the interface includes means for constructing a content missing event packet.

4. The system of claim 3 wherein the commands received as data from the auxiliary display platform comprise input/output (I/O) control commands, and wherein the class extension object receives the I/O control commands from the auxiliary display device driver via the interface set, interprets the I/O control commands, and calls back to the auxiliary display device driver via the interface with corresponding data translated from the I/O control commands.

5. The system of claim 3 further comprising a monitor process, wherein the class extension object communicates with the monitor process to perform security checks on the commands received as data from the auxiliary display platform.

6. The system of claim 3 wherein the interface and class extension object are provided in at least one auxiliary display-related library.

7. The system of claim 3 further comprising an auxiliary display bitmap library.

8. The system of claim 3 wherein the interface includes means for providing event data from the auxiliary display device driver to the class extension object, to facilitate providing corresponding event information to the auxiliary display platform.

9. The system of claim 3 wherein the interface set includes an interface having at least one of: means for registering the auxiliary display device driver with the class extension object and means for forwarding commands from the auxiliary display device driver to the class extension object.

10. The system of claim 3 wherein the interface set includes an interface that is used to execute commands on the device, wherein the interface includes at least one of: means for controlling display characteristics on the auxiliary display device, means for setting system information on the auxiliary display device, means for providing security information of a calling process, means for determining capabilities of the auxiliary display device, means for enabling applications to run on the auxiliary display device, means for sending a notification to the auxiliary device, means for removing at least one notification from the auxiliary device, means for sending application-related content to the auxiliary device, means for uploading software code to run on the device, and means for removing at least one set of application-related content from the auxiliary device.

11. A computer storage medium having computer-executable instructions stored thereon, the computer-executable instructions when implemented cause a computing device to perform steps, comprising:
receiving by a defined interface set comprising logical auxiliary display operations with a call from an auxiliary display device driver, the call including a command related to performing an operation related to an auxiliary display, wherein the defined interface set comprises code that is external to the auxiliary display device driver;
translating by the defined interface set the call and command into data in a data format understood by the auxiliary display device driver; and
calling back the auxiliary display device driver with the data,
wherein the call is received from the auxiliary display device driver via the defined interface set implemented by the auxiliary display device driver, and wherein calling back the auxiliary display device driver comprises returning the data via a call back registered via the defined interface set, and
wherein the defined interface set is used to create device event data for communicating events received from the auxiliary display from the auxiliary display device driver to a separate auxiliary display platform, the device event data including a content missing event packet.

12. The computer storage medium of claim 11 having further computer-executable instructions which when implemented cause the computing device to perform a step comprising, performing security checks related to the command.

13. The computer storage medium of claim 11 having further computer-executable instructions which when implemented cause the computing device to perform a step comprising, determining whether a user may interact with an auxiliary display device via the auxiliary display device driver based on user identification information and a current operating mode.

14. The computer storage medium of claim 13 wherein the current operating mode may be changed to allow different types of access to the device, and wherein the current operating mode corresponds to one of: a single user mode, a multiple users mode, a mode for a current device user that has data on the device, and a mode that allows access to a current console user of a host computer system on which the auxiliary display device driver runs.

15. The method of claim 1, the calls corresponding to commands received from the auxiliary display platform including at least one logical auxiliary display operation selected from the group consisting of a first operation, a second operation, a third operation, a fourth operation, a fifth operation, a sixth operation, a seventh operation, an eighth operation, a ninth operation, a tenth operation, an eleventh operation, a twelfth operation, a thirteenth operation, a fourteenth operation, and a fifteenth operation,
the first operation indicating to the auxiliary display device a designated user of the auxiliary display device,
the second operation requesting from the auxiliary display device an indication of a current designated user of the auxiliary display device,
the third operation indicating to the auxiliary display device a short date format to use,
the fourth operation indicating to the auxiliary display device a long date format to use,
the fifth operation indicating to the auxiliary display device a short time format to use,
the sixth operation indicating to the auxiliary display device a long time format to use,
the seventh operation requesting from the auxiliary display device a default set of applications to be enabled,
the eighth operation indicating to the auxiliary display device an eighth application to be enabled on the auxiliary display device,
the ninth operation indicating to the auxiliary display device a ninth application to be disabled on the auxiliary display device,
the tenth operation indicating to the auxiliary display device a tenth notification for a tenth application on the auxiliary display device, the tenth operation further indicating an expiration time after which the tenth notification should be removed from view on the auxiliary display device, the tenth operation further indicating an identifier for the tenth notification,
the eleventh operation indicating to the auxiliary display device an eleventh identifier for an eleventh active notification for an eleventh application to be removed,
the twelfth operation indicating to the auxiliary display device that all notifications for a twelfth application to be removed,
the thirteenth operation indicating to the auxiliary display device a thirteenth content for a thirteenth application on the auxiliary display device, the thirteenth operation further indicating an identifier of a thirteenth renderer associated with the thirteenth content,
the fourteenth operation indicating to the auxiliary display device a fourteenth application and a fourteenth renderer, the fourteenth operation further indicating to the auxiliary display device that all content associated with the fourteenth application and the fourteenth renderer is to be removed from the auxiliary display device, the fifteenth operation indicating to the auxiliary display device to suppress notifications generated by the auxiliary display device.

16. The method of claim 15, the calls corresponding to commands received from the auxiliary display platform including the first operation, the second operation, the third operation, the fourth operation, the fifth operation, the sixth operation, the seventh operation, the eighth operation, the ninth operation, the tenth operation, the eleventh operation, the twelfth operation, the thirteenth operation, the fourteenth operation, and the fifteenth operation.

17. The method of claim 15, the calls corresponding to commands received from the auxiliary display platform including the third operation, the fourth operation, the fifth operation, and the sixth operation.

18. The method of claim 15, the calls corresponding to commands received from the auxiliary display platform including the seventh operation, the eighth operation, and the ninth operation.

19. The method of claim 15, the calls corresponding to commands received from the auxiliary display platform including the tenth operation, the eleventh operation, and the twelfth operation.

20. The method of claim 15, the calls corresponding to commands received from the auxiliary display platform including the thirteenth operation, the fourteenth operation, and the fifteenth operation.

* * * * *